US007399562B2

(12) United States Patent
Yang et al.

(10) Patent No.: US 7,399,562 B2
(45) Date of Patent: Jul. 15, 2008

(54) TRANSITION FILM OF FLAT PANEL DISPLAY AND A METHOD USING THE SAME

(75) Inventors: Wen-Ping Yang, Dali (TW); Wen-Kuen Chen, Jhubei (TW); Cheng-Wei Li, Kaohsiung (TW)

(73) Assignee: AU Optronics Corp., Hsinchu (TW)

( * ) Notice: Subject to any disclaimer, the term of this patent is extended or adjusted under 35 U.S.C. 154(b) by 421 days.

(21) Appl. No.: 11/141,896

(22) Filed: Jun. 1, 2005

(65) Prior Publication Data

US 2006/0141173 A1 Jun. 29, 2006

(30) Foreign Application Priority Data

Dec. 23, 2004 (TW) .............................. 93140224 A

(51) Int. Cl.
*C09K 19/00* (2006.01)
*C09K 19/52* (2006.01)

(52) U.S. Cl. ....................... 430/20; 430/270.1; 428/1.1; 428/1.2; 252/299.01; 349/176; 438/149

(58) Field of Classification Search ............ 252/299.01; 430/20, 270.1; 349/176; 428/1.1, 1.2; 438/149; 254/291
See application file for complete search history.

(56) References Cited

U.S. PATENT DOCUMENTS

2005/0140283 A1 * 6/2005 Lau et al. .................... 313/506

FOREIGN PATENT DOCUMENTS

| | | |
|---|---|---|
| CN | 1499223 | 5/2004 |
| JP | 2002372616 | 12/2002 |
| JP | 2003149632 | 5/2003 |

OTHER PUBLICATIONS

CN Office Action mailed May 18, 2007.

* cited by examiner

*Primary Examiner*—Geraldina Visconti
(74) *Attorney, Agent, or Firm*—Thomas, Kayden, Horstemeyer & Risley

(57) ABSTRACT

A flat panel display comprising a liquid crystal module, a backlight module, and a transition film is disclosed. The backlight module provides light to the liquid crystal module, and the transition film is disposed above the liquid crystal module. The transition film comprises a material capable of filtering light of specific wavelengths. The material can be organic dye material phthal-ocyanine Copper (CuPc) or $C_{32}H_{16}N_8Cu$. The transition film can be an evaporation layer, so the transition film can be formed on the polarizer of the liquid crystal module. The transition film has a transparency ratio with respect to blue light and a transparency ratio with respect to red light, and the ratios range from 0.5 to 0.95. The transparency ratio with respect to blue light is greater than that with respect to red light. The backlight module comprises one or more light emitting diodes (LEDs) to provide light.

19 Claims, 4 Drawing Sheets

TRANSITION FILM OF FLAT PANEL DISPLAY AND A METHOD USING THE SAME

BACKGROUND

The invention relates to a flat panel display, and in particular, to a flat panel display with a transition film.

Light emitting diodes (LED) have recently been widely used as backlight sources in flat display displays. The light generated therefrom, however, is not perfectly white. For example, the red and green components of the light maybe brighter than the blue one, thus causing a yellowish tint. This effect is referred to as color shift.

To correct the problem, a conventional technique is to provide a colored diffusion film in the backlight module. FIG. 1 shows a conventional flat panel display 100 comprising a light source 108, a light guide 106 and a diffusion film 104. The light guide 106 is positioned by the light source 108 to transform the point light into a surface light, and the diffusion film 104 uniforms the surface light by diffusion and scattering. The uniformed surface light is then used to illuminate the liquid crystal module 102, which comprises pixel arrays to generate images.

The conventional method however has some problems. When the panel is squeezed or distorted, the diffusion film 104 loses its uniformity. Besides, fabrication of such panel modules is difficult. The diffusion film 104 tends to stick with other films, thus varying the generated surface light.

SUMMARY

An embodiment of the invention provides a flat panel display comprising a liquid crystal module, a backlight module, and a transition film. The backlight module serves a light source for the liquid crystal module, and the transition film is layered above the liquid crystal module. The transition film comprises a material capable of filtering light of specific wavelengths. The material is an organic dye material phthal-ocyanine Copper (CuPc), with molecular formula as $C_{32}H_{16}N_8Cu$. The transition film can be an evaporation layer on the polarizer of a liquid crystal module. The transparency ratio of the transition film with respect to blue light and the transparency ratio of the transition film with respect to red light range between 0.5 and 0.95. In another embodiment, the transparency ratio of the transition film with respect to blue light is greater than that with respect to red light. The backlight module also comprises one or more light emitting diodes (LEDs) to provide light.

Another embodiment of the invention provides a liquid crystal module comprising a first substrate and a second substrate, a liquid crystal layer, a polarizer and a transition film. The liquid crystal layer is disposed between the first substrate and the second substrate. The polarizer is disposed above the first substrate, and the transition film is layered above the polarizer. The first substrate can be a color filter substrate, or a Mother Glass.

A further embodiment of the invention provides a method for color shift correction in flat panel display having one or more LEDs. A color coordinate corresponding to the illumination of the one or more LEDs is measured. A transition film is then formed on the flat panel display, wherein the thickness of the transition film is determined by the measured coordinate. The transition film, can be formed by evaporating an organic dye material, phthal-ocyanine Copper (CuPc), on a film. Alternatively, the transition film can be formed by attaching a film doped with an organic dye material phthal-ocyanine Copper (CuPc).

BRIEF DESCRIPTION OF THE DRAWINGS

The following detailed description, given by way of example and not intended to limit the invention solely to the embodiments described herein, will best be understood in conjunction with the accompanying drawings, in which.

Figure 1:
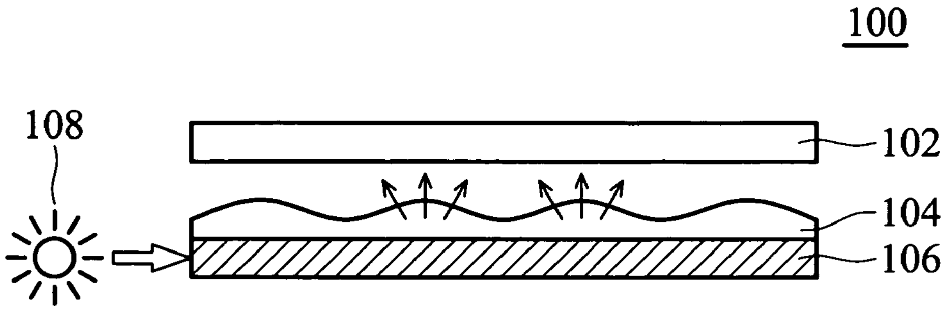
FIG. 1 shows a conventional flat panel display 100.
Figure 2:
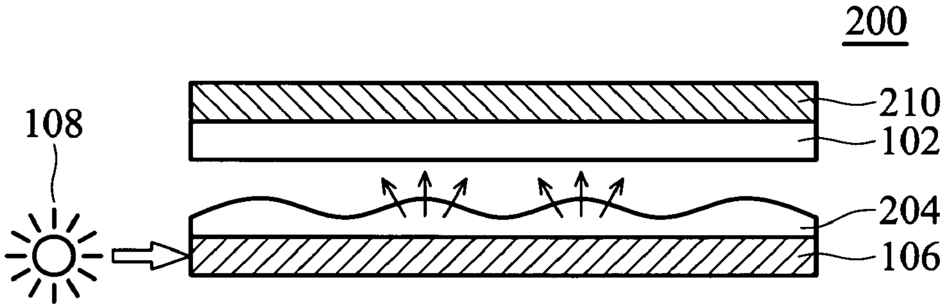
FIG. 2 shows a flat panel display according to an embodiment of the invention.
Figure 5:
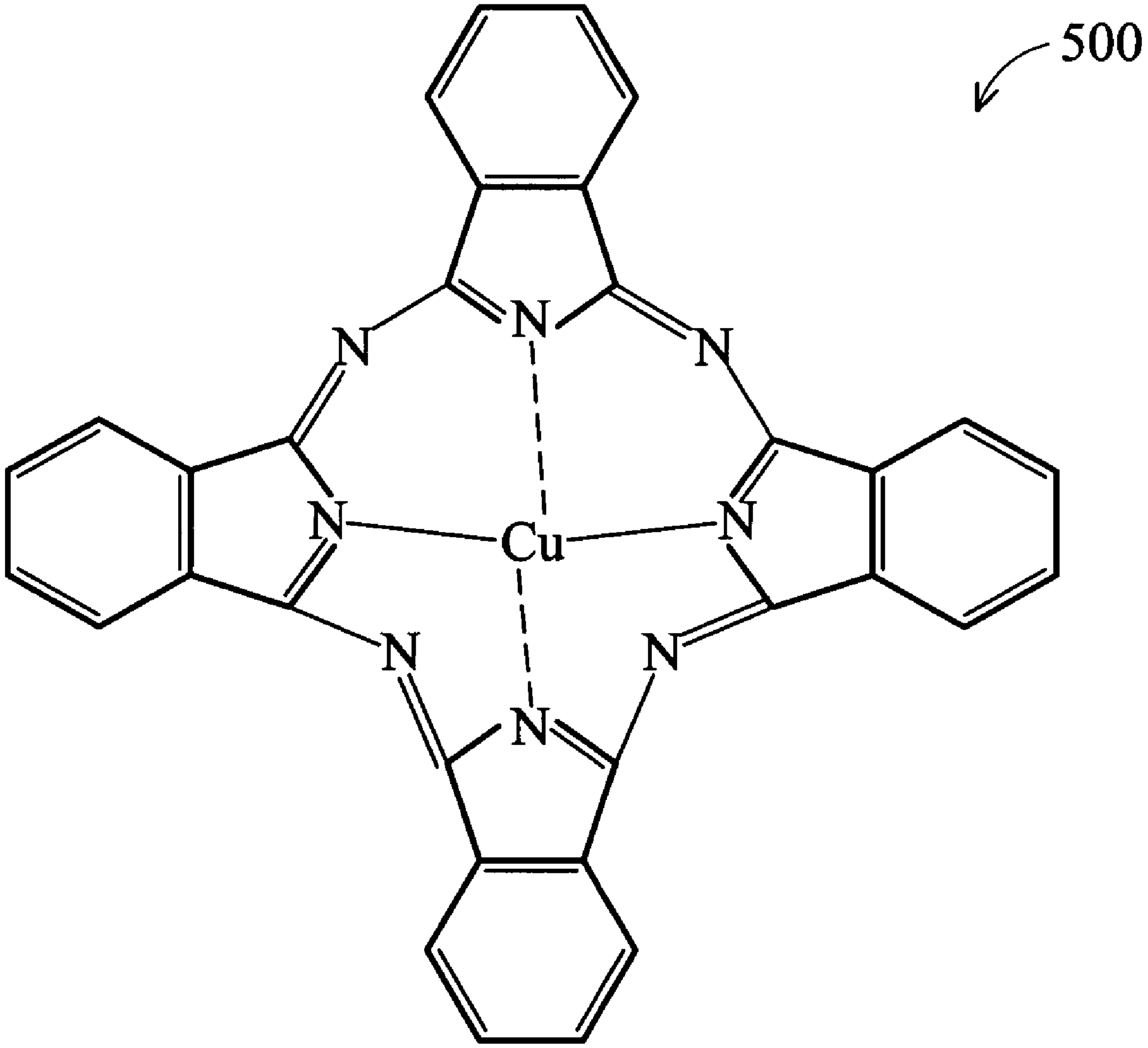
Figure 6:
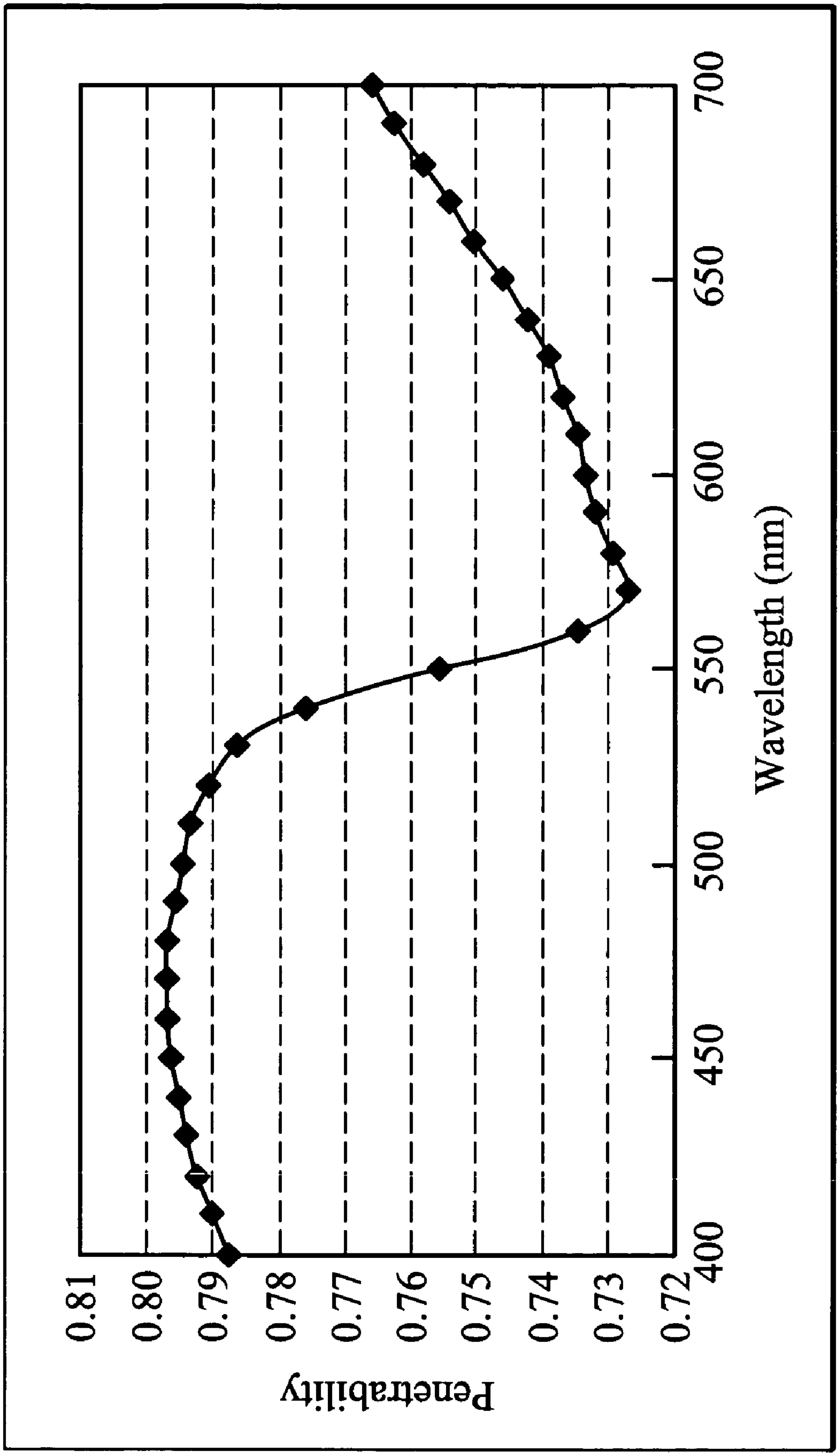

FIG. **4*a* shows an embodiment of the transition film in FIG. 2**;

FIG. **4*b* shows an embodiment of the transition film in FIG. 2**;

FIG. 5 shows the molecular formula of the organic dye material, $C_{32}H_{16}N_8Cu$; and FIG. 6 is the transparency ratio of CuPc corresponding to various light wavelengths.

DETAILED DESCRIPTION OF THE INVENTION

FIG. 2 shows a flat panel display 200 according to an embodiment of the invention, comprising a light source 108, a light guide 106 and a liquid crystal module 102. The light guide 106 guides the light from the light source 108, and transforms point light into surface light to illuminate the liquid crystal module 102. The liquid crystal module 102 comprises a pixel array and driving circuits to generate images. Additionally, the flat panel display comprises a transition film 210 for correcting color shift caused by the light source 108. The transition film 210 is layered on the surface of the flat panel display 200, therefore it is easy to implement into fabrication.

Figure 3:
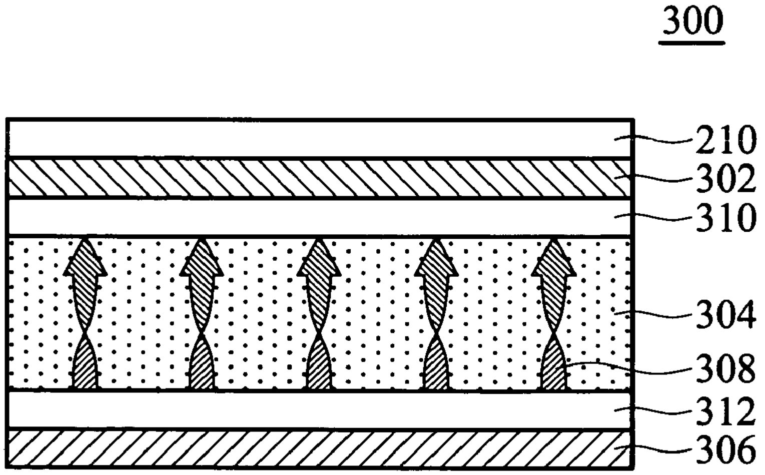
FIG. 3 shows a liquid crystal module according to an embodiment of the invention.

In another embodiment, the transition film is implemented in the liquid crystal modules. FIG. 3 shows a liquid crystal module 300 according to an embodiment of the invention. The liquid crystal module 300 comprises an upper substrate 310, a lower substrate 312, a polarizer 302, a polarizer 306, and a liquid crystal layer 304. The liquid crystal 304 is distorted by the applied electronic field, and the polarity 308 changes accordingly. In this embodiment, an independent transition film 210 is layered above the polarizer 302.

Figure 4A:
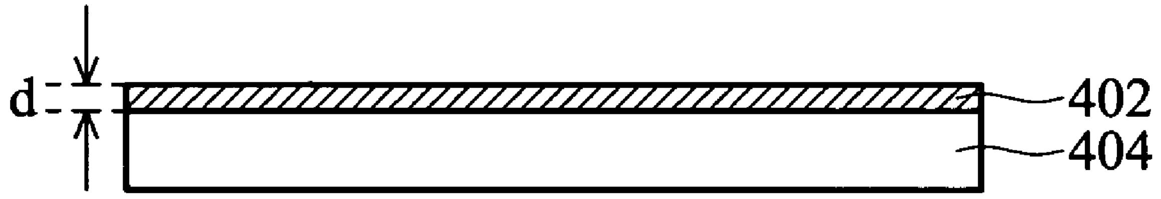
Figure 4B:
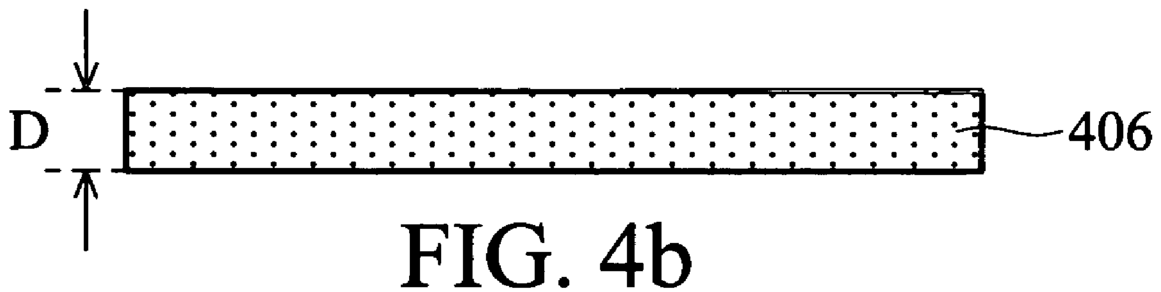

FIG. **4*a* shows a close look of the transition film 210 in FIG. 2. The transition film 302 is formed on a glass substrate 404. The transition film is an evaporation layer 402 having thickness d. The composition of the transition layer 402 may depend on the requirements of the color shift and wavelengths. Alternatively, the architecture of the transition film 210, as shown in FIG. 4*b*, can be a mother glass doped with an organic dye material, thus forming a transition film 406, and the color correction is based on the thickness of the transition film 406** and the doping intensity. The mother glass can also be a diffusion film.

FIG. 5 shows the molecular formula of the organic dye material, $C_{32}H_{16}N_8Cu$. The material is referred to as Copper (U) phthalocyanine (CuPc) 500, each molecule comprises eight N atoms surrounding a Cu atom. The CuPc is purple sheet crystal with a melting point greater than 360° C.

FIG. 6 is the transparency ratio of CuPc with respect to various light wavelengths. When CuPc is evaporated onto the mother glass, the relationship between thickness and the C.I.E (Commission Internationale de l'clairage) color coordinate is specifically shown in the form of, $$X=-0.0002d+0.3465$$

$$Y=-0.00004d+0.3882$$

Where X and Y are parameters in C.I.E coordinate, and d is the thickness of CuPc. FIG. 6 shows that the CuPc has a linear relation with respect to X, but is mute with respect to Y. Therefore, by controlling the thickness d, color shift in the color coordinate can be corrected. Physically, CuPc has a better transparency ratio with respect to blue light and lower transparency ratios with respect to red/green lights. The transparency ratio with respect to blue light and that with respect to red light range from 0.5 to 0.95. If the transition film is a doped film, the transparency ratio thereof is linearly relative to the thickness and doping intensity.

In summary, the invention efficiently corrects the color shift by adjusting the thickness of the transition film. The fabrication is more convenient by attaching the transition film to the surface of the flat panel display, thus avoiding sticking and distortion.

While the invention has been described by way of example and in terms of the preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A flat panel display, comprising:

a liquid crystal module;

a backlight module to provide light to the liquid crystal module; and a color correction film disposed above the liquid crystal module for correction of color shift.

2. The flat panel display as claimed in claim 1, wherein the color correction film comprises a material capable of filtering light of specific wavelengths.

3. The flat panel display as claimed in claim 2, wherein the material is an organic dye material comprising phthal-ocyanine Copper (CuPc) or $C_{32}H_{16}N_8Cu$.

4. The flat panel display as claimed in claim 1, wherein the color correction film is an evaporation layer.

5. The flat panel display as claimed in claim 4, wherein the liquid crystal module comprises a polarizer, and the color correction film is disposed thereon.

6. The flat panel display as claimed in claim 1, wherein the color correction film has a first transparency ratio with respect to blue light and a second transparency ratio with respect to red light, and the first and the second transparency ratios range from 0.5 to 0.95.

7. The flat panel display as claimed in claim 1, wherein the color correction film has a first transparency ratio with respect to blue light and a second transparency ratio with respect to red light, and the first transparency ratio is greater than the second transparency ratio.

8. The flat panel display as claimed in claim 1, wherein the backlight module comprises one or more light emitting diodes (LEDs).

9. A liquid crystal module, comprising:

a first substrate;

a second substrate;

a liquid crystal layer disposed between the first substrate and the second substrate;

a polarizer disposed on the first substrate; and a color correction film disposed on the polarizer for correction of color shift.

10. The liquid crystal module as claimed in claim 9, wherein the color correction film comprises a material capable of filtering light of specific wavelengths.

11. The liquid crystal module as claimed in claim 10, wherein the material is an organic dye material phthal-ocyanine Copper (CuPc) or $C_{32}H_{16}N_8Cu$.

12. The liquid crystal module as claimed in claim 9, wherein the color correction film is an evaporation layer.

13. The liquid crystal module as claimed in claim 9, wherein the color correction film has a first transparency ratio with respect to blue light and a second transparency ratio with respect to red light, and the first and the second transparency ratios range from 0.5 to 0.95.

14. The liquid crystal module as claimed in claim 13, wherein the color correction film has a first transparency ratio with respect to blue light and a second transparency ratio with respect to red light, and the first transparency ratio is greater than the second transparency ratio.

15. The liquid crystal module as claimed in claim 9, wherein the first substrate is a color filter substrate.

16. The liquid crystal module as claimed in claim 9, wherein the first substrate is a Mother Glass.

17. A method for color shift correction in a flat panel display having one or more LEDs, comprising:

measuring a color coordinate corresponding to the illumination of the one or more LEDs; and forming a color correction film on the flat panel display for correction of color shift, wherein the thickness of the color correction film is determined by the measured color coordinate.

18. The method as claimed in claim 17, wherein forming a color correction film comprises evaporating a phthal-ocyanine Copper (CuPc) film on the flat panel display.

19. The method as claimed in claim 17, wherein forming a color correction film comprises attaching an optical film doped with phthal-ocyanine Copper (CuPc) on the flat panel display.

* * * * *